D. H. TWAITS.
GREASE CUP BODY.
APPLICATION FILED JAN. 19, 1914.
1,222,910.
Patented Apr. 17, 1917.
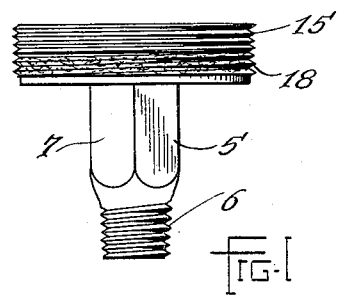
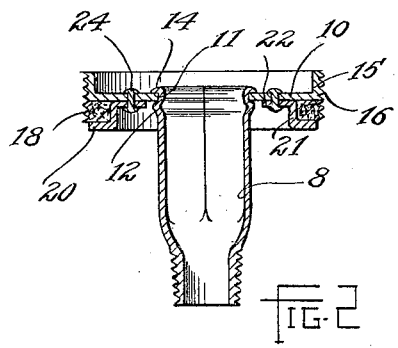
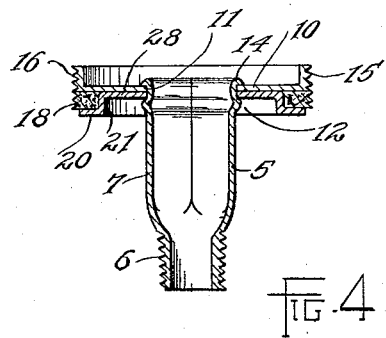
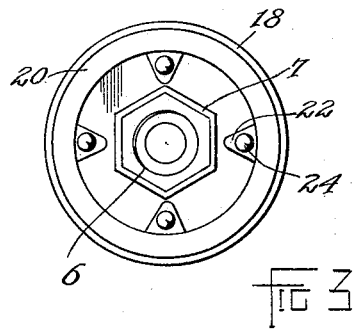
Witnesses
Inventor
Daniel H. Twaits
By Albert H. Bates.
Atty

UNITED STATES PATENT OFFICE.

DANIEL H. TWAITS, OF CHICAGO, ILLINOIS.

GREASE-CUP BODY.

1,222,910.   Specification of Letters Patent.   Patented Apr. 17, 1917.

Application filed January 19, 1914. Serial No. 812,874.

*To all whom it may concern:*

Be it known that I, DANIEL H. TWAITS, a citizen of the United States, residing at Chicago, in the county of Cook and State of Illinois, have invented a certain new and useful Improvement in Grease-Cup Bodies, of which the following is a full, clear, and exact description, reference being had to the accompanying drawings.

This invention relates to grease cup bodies or bases wherein there is a stem threaded at its lower end and an enlarged head rigid with the stem and having external threads adapted to fit the interior of a suitable cap. The general object is to provide a strong durable body, which shall be simple in construction and very cheaply manufactured. A further object is to provide the head with a resilient member adapted to engage the interior of the cup to prevent leakage of grease past the head and to provide a simple, efficient means for holding said resilient member in position on the grease cup base.

My invention is hereinafter more fully described in connection with the accompanying drawings, and the essential characteristics set out in the claims.

Figure 1 is a side elevation of my grease cup base; Fig. 2 is a central vertical section of the same; Fig. 3 is a bottom plan of the same and Fig. 4 is a central vertical section showing a modified construction.

In the drawings 5 indicates the stem of the body which has an externally threaded portion 6 at its lower end, an angular intermediate portion 7 and an internal passage 8. At the upper end the stem is secured to a disk-like member 10 in the following manner:

The disk-like member is provided with a central angular opening 11 adapted to fit over the angular exterior of the stem and is engaged at its lower side adjacent the opening, by an outwardly extending bead 12 formed at the upper portion of the stem. The stem extends through the angular opening and at the upper end the metal is spread outwardly as at 14, to engage the upper side of the disk-like member thereby securely holding the same in position. This disk-like member is provided at its periphery with an upwardly turned flange 15 which is externally threaded at 16 to coöperate with the internal threads of the cap member of the grease cup.

Beneath the disk-like member 10, is a resilient member 18 preferably of leather, felt or like material, of such a diameter that its periphery may conform to the threads of the interior of the cap. This resilient ring member is held in position by a ring 20 having a flat portion engaging the lower side of the resilient ring and having an upwardly turned flange 21 engaging the inner periphery of the resilient ring, and inwardly projecting lugs 22, adapted to rest against the disk-like member 10 and be secured thereto in any suitable manner, as for example, electrically welded or secured by rivets, indicated at 24.

In the modified construction shown in Fig. 4, the ring 20 is provided with an inwardly projecting flange or disk-like portion 28 instead of the lugs 22, and this disk-like portion is provided with an angular opening of the same size as the opening 11 in the disk-like member 10, which fits over the upper end of the stem. The member 20 supporting the washer is securely held in position by the outwardly projecting bead 12 of the stem engaging the lower side of the disk-like portion 28, while the stem extends through the members 28 and 10 and is upset at 14 to engage the upper side of the member 10.

Having thus described my invention, what I claim is:

1. In a grease cup body, the combination of a tubular stem, a disk member immovably secured to one end of the stem, a resilient ring member on one side of said disk member, a separate ring contiguous to the other side of the resilient member and having inwardly projecting means located outside of the stem for securing the ring member in position.

2. In a grease cup body, the combination of a tubular stem, a disk secured to the upper end thereof, a resilient ring on one side of said disk, a ring member contiguous with the other side of the resilient ring having a flange turned toward the disk and a portion projecting inwardly from said flange and contiguous with said disk, and means for holding said portion in position.

3. In a grease cup body, the combination of a tubular stem, a disk secured to the upper end thereof, a resilient ring on one side of said disk, a ring on the other side of said resilient ring having a flange turned toward the disk and having inwardly projecting lugs lying against said disk and secured thereto.

4. In a grease cup body, the combination of a tubular stem, a disk secured to the upper end thereof having a threaded periphery, a resilient ring on one side of said disk of substantially the same diameter as the disk, a ring on the other side of the resilient member of slightly smaller diameter than the resilient ring and disk and having a flange turned toward the disk contiguous with the inner periphery of the resilient member, and means for securing the same in place.

5. In a grease cup body, the combination of a tubular stem, a disk secured to the upper end thereof having external threads on its periphery, a resilient ring on one side of the disk, a circular member having a flange turned toward the disk and contiguous with the inner periphery of the resilient ring and having lugs projecting inwardly from said flange and lying against the surface of said disk, and means for securing said lugs to said disk.

6. In a grease cup, the combination of a stem, an outwardly extending head rigid with the upper portion of the stem and having a threaded periphery, a resilient member of substantially the same diameter as the head at one side thereof, a retaining member engaging the side of said resilient member and having a circular periphery slightly smaller in diameter than the base of the threads, and upset metal means for securing said retaining member in position.

In testimony whereof, I hereunto affix my signature in the presence of two witnesses.

DANIEL H. TWAITS.

Witnesses:
KARL KUHNEN,
C. H. CRONK.

Copies of this patent may be obtained for five cents each, by addressing the "Commissioner of Patents, Washington, D. C."